April 14, 1959     J. E. FLECKENSTEIN     2,882,042
VAPOR PRESSURE SPRING
Filed Jan. 6, 1958
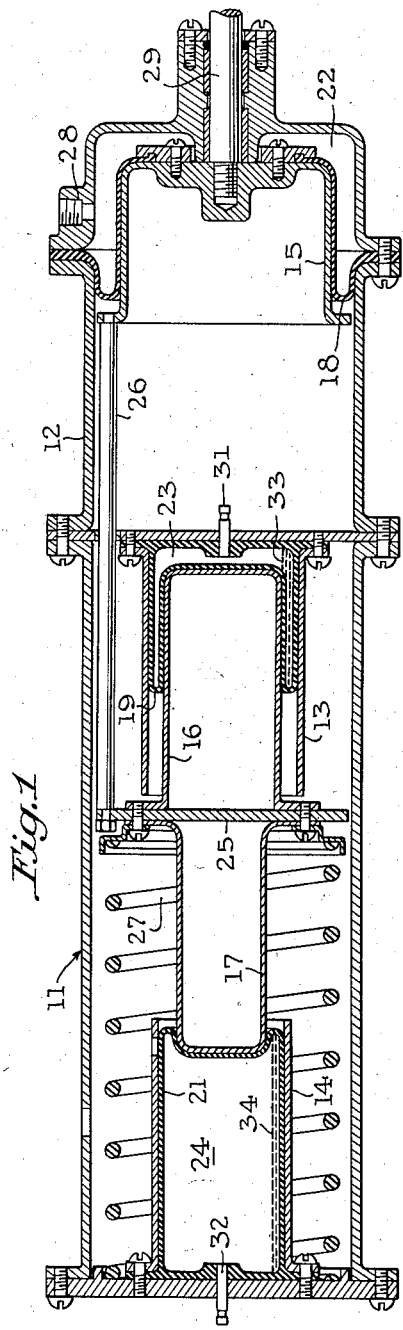
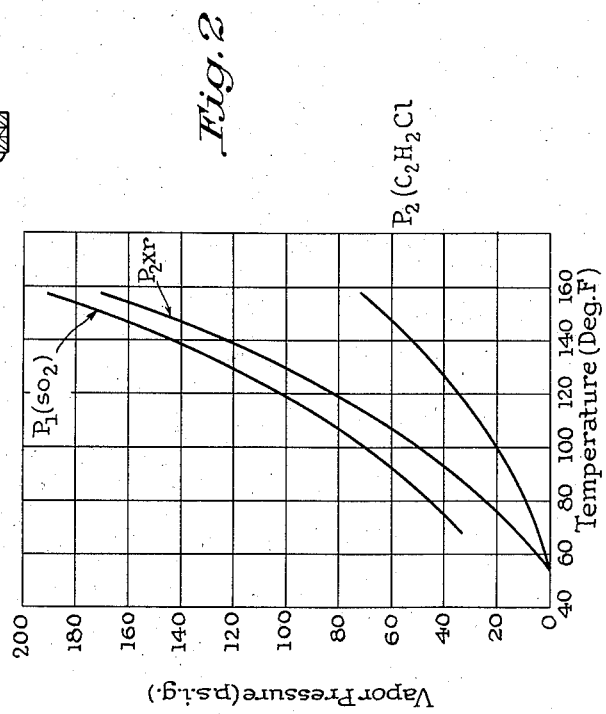
INVENTOR
Joseph E. Fleckenstein
BY Dodge and Sons
ATTORNEYS

United States Patent Office 2,882,042
Patented Apr. 14, 1959

2,882,042

VAPOR PRESSURE SPRING

Joseph E. Fleckenstein, Milwaukee, Wis., assignor to Johnson Service Company, Milwaukee, Wis., a corporation of Wisconsin Application January 6, 1958, Serial No. 707,179

3 Claims. (Cl. 267—34)

This invention relates to springs and more particularly to springs of the type wherein the applied force is resisted by the pressure of a saturated vapor.

Springs of this type generally take the form of an expansible chamber fluid pressure motor comprising a working chamber and a movable abutment having an effective area subject to the pressure in the working chamber. The chamber is evacuated and partially filled with a quantity of volatile liquid sufficient to charge the chamber with a saturated vapor. The liquid selected must have a critical temperature higher than the operating temperature of the spring so that the saturated or equilibrium condition can exist. As soon as the liquid is placed in the chamber it commences to evaporate and charge the chamber with a saturated vapor at the vapor pressure of the liquid for that particular temperature. The vapor and liquid in the working chamber are in equilibrium and thus any vapor lost through leakage during operation is replaced by the evaporation of additional liquid. This process of automatic replacement continues until all of the liquid has evaporated and therefore the springs can be operated for long periods of time without maintenance.

The vapor pressure spring has one serious disadvantage. Since the pressure in the working chamber is the vapor pressure of the liquid and since vapor pressure is a function of temperature, the reactive force exerted by the spring will vary with its temperature. This problem can be solved by controlling the temperature of the spring but this solution requires complicated and therefore costly equipment.

It is an object of this invention to provide a saturated vapor pressure spring which exerts a substantially constant reactive force regardless of spring temperature. According to the invention, the spring comprises two saturated vapor pressure motors, of the type mentioned above, connected in opposing relationship. The effective areas of the two movable abutments are unequal and two different volatile liquids are employed; the working chamber containing the liquid having the lower vapor pressure being associated with the motor having the larger effective area. The ratio of the effective areas of the movable abutments is so correlated with the vapor pressure versus temperature characteristics of the two liquids, that the difference in the forces exerted by the two motors is substantially constant throughout the operating temperature range of the spring. Since the motors are connected in opposing relationship, the spring exerts a constant reactive force equal to the difference between the forces exerted by the two motors.

Because of the fact that the vapor and liquid in both working chambers are in equilibrium, changes in volume have no effect upon pressure (neglecting transitory conditions). Therefore, the spring of this invention, like other vapor pressure springs, exerts a reactive force which is independent of spring displacement. This characteristic is useful in many applications but when it is necessary to provide a graduated reaction, the present vapor spring can be combined with a mechanical spring to give a definite amount of motion for a particular force application.

The invention will now be described in detail in connection with the accompanying drawings, in which:

Fig. 1 is a sectional view of the preferred form of the invention; the control pressure motor being shown in the unenergized position.

Fig. 2 is a graph of vapor pressure versus temperature for the substances sulphur dioxide and ethyl chloride; the graph including a curve representing the term "$p_2r$" in Equations 3.

As used herein, the abbreviation p.s.i.g. means gauge pressure (i.e., the difference between the pressure of the fluid and atmospheric pressure) expressed in pounds per square inch, and p.s.i.a. means absolute pressure (i.e., the sum of gauge pressure and atmospheric pressure) expressed in pounds per square inch.

Referring to Fig. 1, the preferred form of vapor spring is embodied in a fluid pressure actuator 11. The actuator comprises three coaxial cylinders 12, 13 and 14, and a trio of reciprocable pistons 15, 16 and 17, connected thereto by rubber rolling diaphragms 18, 19 and 21, respectively. These three sets of elements form working chambers 22, 23 and 24; the first being part of a fluid pressure control motor and the last two being parts of the two vapor pressure motors which form the vapor spring. The pistons 16 and 17 of the vapor pressure motors are attached to the plate 25 in opposing relationship and this plate is, in turn, connected to the control motor piston 15 by three rods 26 (only one of which is shown). A coil spring 27 reacts between the left end of cylinder 12 and the plate 25 to urge the motors to the positions shown in the drawing. A variable control pressure is transmitted to working chamber 22 by a port 28 and the control motor piston 15 is connected to the device to be controlled (not shown) by a piston rod 29.

During assembly, the working chambers 23 and 24 of the two vapor pressure motors are evacuated through tubes 31 and 32, respectively, and are charged with volatile liquids 33 and 34, respectively. Subsequently the tubes 31 and 32 are pinched closed, as shown, to seal the working chambers. The volatile liquids employed must have critical temperatures higher than the maximum temperature which the actuator will encounter during operation. When the maximum temperature does not exceed 160° F., satisfactory performance can be obtained by using sulphur dioxide, $SO_2$, as liquid 34 and ethyl chloride, $C_2H_2Cl$, as liquid 33. The quantity of each liquid used depends first, on the expected leakage from the associated working chamber over the desired period of operation, and second, on the amount of liquid required to fill the maximum volume of the associated working chamber with a saturated vapor at any temperature within the operating temperature range. In the interest of clarity, the quantities shown in the liquid phase in the working chambers 23 and 24 of Fig. 1 have been greatly exaggerated. It will be remembered that a very small amount of volatile liquid will produce a rather large volume of saturated vapor.

As the liquids 33 and 34 are introduced into working chambers 23 and 24, they will immediately commence to evaporate and this process will continue until the pressures in the two chambers rise to the vapor pressures of the respective liquids at the particular temperature of the actuator at that time. When evaporation ceases, each chamber will contain liquid and vapor phases in equilibrium, and the pressures in these chambers will be the vapor pressures of the particular liquids as long as there is sufficient liquid present to produce a saturated vapor. During operation, some of the vapor will escape from each chamber but the rate of leakage will be offset by the automatic evaporation of additional liquid.

An inspection of Fig. 1 will show that the diameter of vapor motor cylinder 13 is greater than the diameter of vapor motor cylinder 14. This inequality is important because, as will appear from the following discussion, the ratio of the effective area of piston 16 and diaphragm 19 to the effective area of piston 17 and diaphragm 21 determines the temperature characteristic of the vapor spring.

By way of example, assume that liquid 33 is ethyl chloride, that liquid 34 is sulphur dioxide, and that the actuator must be able to operate in an environment where the temperature varies between 54° F. and 158° F. Table I and Fig. 2 show the vapor pressure-temperature relationship of sulphur dioxide and ethyl chloride in this operating temperature range; the values being taken from the International Critical Tables, volume III, pages 231 and 236, and converted into degrees Fahrenheit and pounds per square inch by the equations:

$$°C = \frac{5}{9}(°F-32)$$

and one normal atmosphere=14.696 p.s.i.a.

*Table I*

| Temp. (° F.) | $SO_2$ | | $C_2H_5Cl$ | |
|---|---|---|---|---|
| | p.s.i.a. | p.s.i.g. | p.s.i.a. | p.s.i.g. |
| 53.94 | 35.812 | 21.119 | 14.696 | 0.000 |
| 68.00 | 47.438 | 32.742 | 19.545 | 4.849 |
| 86.00 | 66.102 | 51.406 | 27.334 | 12.638 |
| 104.00 | 90.013 | 75.317 | 37.474 | 22.778 |
| 122.00 | 120.154 | 105.458 | 50.260 | 35.564 |
| 140.00 | 157.673 | 142.977 | 66.132 | 51.436 |
| 158.00 | 203.789 | 189.093 | 85.530 | 70.834 |

The net force (F) exerted on plate 25 by the two vapor pressure motors can be expressed as follows, if it be assumed that positive signs indicate forces acting to the right in Fig. 1:

(1) $$F = p_1 A_1 - p_2 A_2$$

where $p_1$ is the pressure in working chamber 24 (viz: the vapor pressure of $SO_2$ in p.s.i.g.), $A_1$ is the effective area of piston 17 and diaphragm 21 against which the pressure in working chamber 24 acts, $p_2$ is the pressure in working chamber 23 (viz: the vapor pressure of $C_2H_5Cl$ in p.s.i.g.), $A_2$ is the effective area of piston 16 and diaphragm 19 against which the pressure in working chamber 23 acts.

Using the vapor pressure values of Table I, the net force equation for various temperatures in the operating range can be written.

(2)

| Temperature (° F.) | Equation |
|---|---|
| 158 | $F = 189.093 A_1 - 70.834 A_2$ |
| 140 | $F = 142.977 A_1 - 51.436 A_2$ |
| 122 | $F = 105.458 A_1 - 35.564 A_2$ |
| 104 | $F = 75.317 A_1 - 22.778 A_2$ |
| 86 | $F = 51.406 A_1 - 12.638 A_2$ |
| 68 | $F = 32.742 A_1 - 4.849 A_2$ |
| 53.94 | $F = 21.119 A_1 - 0.000 A_2$ |

By letting $A_2 = rA_1$ ($r$ being a constant) and dividing each equation by $A_1$, Equations 2 become:

(3)

| Temperature (° F.) | Equation |
|---|---|
| 158 | $F/A_1 = 189.093 - 70.834\ r$ |
| 140 | $F/A_1 = 142.971 - 51.436\ r$ |
| 122 | $F/A_1 = 105.458 - 35.564\ r$ |
| 104 | $F/A_1 = 75.317 - 22.778\ r$ |
| 86 | $F/A_1 = 51.406 - 12.638\ r$ |
| 68 | $F/A_1 = 32.742 - 4.849\ r$ |
| 53.94 | $F/A_1 = 21.119 - 0.000\ r$ |

Now, since "$r$" is a constant (because the effective areas do not change during operation) and since $F/A_1$ must have a constant value independent of temperature for proper spring action, it should be possible to equate any two of the above simultaneous equations and solve for that value of "$r$" which will make $F/A_1$ constant. This would be true if the vapor pressure curves were straight lines but since they are not, an exact solution is not possible. Consequently a trial and error procedure must be adopted in order to determine that value of "$r$" which will give the minimum variation in $F/A_1$ throughout the designated temperature range. The first step in this procedure is to equate adjacent pairs of Equations 3 and solve for "$r$." Thus, taking the equations for 158° F. and 140° F. "$r$" is found as follows:

$$189.093 - 70.834r = 142.977 - 51.436r$$
$$19.398r = 46.116$$
$$r = \frac{46.116}{19.398} = 2.37$$

By similar calculations, the following values of "$r$" are found:

*Table II*

Temperatures:    $r$
Between 158° F. and 140° F. _____ 2.37
Between 140 and 122 _____ 2.36
Between 122 and 104 _____ 2.35
Between 104 and 86 _____ 2.35
Between 86 and 68 _____ 2.39
Between 68 and 54 _____ 2.40

Using these values of "$r$" in Equations 3, the following values of $F/A_1$ are obtained:

*Table III*

| | $F/A_1$ | | | | | |
|---|---|---|---|---|---|---|
| $r=$ | 2.35 | 2.36 | 2.37 | 2.38 | 2.39 | 2.40 |
| Temperature (°F.): | | | | | | |
| 158.00 | 22.634 | 21.925 | 21.217 | 20.509 | 19.800 | 19.092 |
| 140.00 | 22.103 | 21.589 | 21.074 | 20.560 | 20.045 | 19.531 |
| 122.00 | 21.883 | 21.527 | 21.172 | 20.816 | 20.461 | 20.105 |
| 104.00 | 21.789 | 21.561 | 21.334 | 21.106 | 20.878 | 20.650 |
| 86.00 | 21.707 | 21.581 | 21.454 | 21.328 | 21.202 | 21.075 |
| 68.00 | 21.347 | 21.299 | 21.250 | 21.202 | 21.153 | 21.105 |
| 53.94 | 21.119 | 21.119 | 21.119 | 21.119 | 21.119 | 21.119 |

Since the mechanism will be assembled and adjusted in an environment of 68° F., the value of $F/A_1$ at this temperature is taken as the standard. The maximum deviations of $F/A_1$ from the value at 68° F., expressed as percentages of the 68° F. value, appear in Table IV:

*Table IV*

| $r$ | Between 68° F. and 158° F. | Between 68° F. and 53.9° F. |
|---|---|---|
| 2.35 | +6.02 / −0.00 | +0.00 / −1.06 |
| 2.36 | +2.93 / −0.00 | +0.00 / −0.84 |
| 2.37 | +0.96 / −0.83 | +0.00 / −0.62 |
| 2.38 | +0.59 / −3.26 | +0.00 / −0.39 |
| 2.39 | +0.20 / −6.39 | +0.00 / −0.16 |
| 2.40 | +0.00 / −9.53 | +0.66 / −0.00 |

An examination of the percentages in Table IV shows that when $r=2.37$ the variation in $F/A_1$ is a minimum. Therefore, when using sulphur dioxide and ethyl chloride, $r$ must equal 2.37 in order for $F/A_1$ to remain substantially constant throughout the operating temperature range (54° F. to 158° F.). For other ranges and liquids, $r$, of course, will be different.

In Equations 3, $p_2$ was multiplied by $r$. Referring to

Fig. 2, it can be seen that the curves $p_2r$ and $p_1$ are separated by a substantially uniform amount, whereas the curves $p_1$ and $p_2$ are divergent. It should now be apparent that the area ratio $r$ determines the temperature characteristic of the vapor spring because as the spacing between curves $p_2r$ and $p_1$ becomes uniform, the net force F becomes constant.

Equation 1 was set up on the assumption that the net force exerted by the vapor spring acts toward the right. Since the values of $F/A_1$ in Table III are positive, the assumption was correct. It will be noticed that if it be assumed that the force F acts in the opposite direction, the same value of $r$ will be obtained (viz: 2.37) but the sign of $F/A_1$ will be negative. From this it can be concluded that the net force always acts to contract the working chamber containing the liquid having the lower vapor pressure even though the effective area of the movable abutment associated with this chamber is always greater than the effective area of the movable abutment associated with the opposing chamber.

To continue the example, assume that the control pressure in working chamber 22 varies between 5 p.s.i.g. and 10 p.s.i.g. and that the effective area of piston 15 and diaphragm 18, which is subject to this pressure, is 11.4 square inches. The vapor spring would be dimensioned to exert a force of 5 p.s.i.g.$\times$11.4 square inches or 57 pounds so that the preload in mechanical spring 26 is zero. Taking this value of F and the value of $F/A_1$ at 68° F. and $r=2.37$, $A_1$ is found to be 2.682 square inches. $A_2$, then, would equal 2.37$\times$2.682 or 6.356 square inches.

From the above calculations, it can be seen that the maximum deviation in $F/A_1$ from the value at 68° F. occurs at 86° F. and that this deviation, $\Delta F/A_1$, equals 21.454—21.250 or 0.204. Using the value of $A_1$ just determined, it is seen that the maximum variation in net force produced by changes in temperature equals 0.204$\times$2.682 or 0.5471 pound. In order to counteract this change in force, the control pressure in working chamber 22 must rise an amount $\Delta P$, which from the equation $\Delta P \times A_3 = \Delta F$, where $A_3$ is the effective area of piston 15 and diaphragm 18, equals .5471/11.4 or .0479 p.s.i. This is a negligible change in pressure and therefore for all practical purposes the vapor spring exerts a constant force throughout the operating temperature range.

In operation, the actuator would be connected by piston rod 29 to the device which is to be positioned and the port 28 would be connected to a source of variable control pressure. Under the conditions assumed above, the motor piston 15 will not move until the force developed by the fluid pressure in chamber 22, acting on piston 15 and diaphragm 18, rises above 57 pounds. When this value is exceeded, the three pistons 15, 16 and 17 will move to the left against the force exerted by mechanical spring 26 and the difference between the forces exerted by the two vapor pressure motors. This movement reduces the volume of chamber 24 and increases the volume of chamber 23, but, from the following description, it will be seen that these changes do not effect the net force exerted by the vapor spring. It is a well known physical phenomenon that the isothermal pressure-volume curve for a real gas comprises a constant pressure line in the region of equilibrium or saturation below the critical temperature. This fact is significant here, because it means that changes in volume are not accompanied by changes in pressure, i.e., the pressure remains constant at the vapor pressure of the liquid for the particular temperature. Therefore, as the pistons move to the left, the pressures in chambers 23 and 24 initially decrease and increase, respectively, but these changes in pressure cause evaporation and condensation in sufficient amounts to bring the pressures back to their equilibrium values. Therefore, except for transient conditions, the net force exerted by the vapor spring remains constant with spring displacement. It follows, then, that the pistons will move a distance determined solely by the rate of coil spring 26.

When the control presure in chamber 22 is reduced, the vapor and coil springs will move the pistons 15, 16 and 17 to the right. In this case, the pressure in chamber 23 initially increases and the pressure in chamber 24 initially decreases, but since these changes will immediately initiate condensation and evaporation, respectively, the steady state pressures will be quickly re-established.

It should be observed that as the pistons 16 and 17 move inward relatively to their cylinders 13 and 14, the amount of liquid in working chambers 23 and 24 increases. If all of the vapor condenses, an incompressible liquid stop would be created. To avoid this result, the characteristics of the liquids should be correlated with the minimum volumes of the chambers so that each chamber contains some vapor when the associated piston is fully retracted.

The device illustrated and described represents only a preferred embodiment of the invention. Since other volatile liquids can be employed and since the structure of the vapor spring can be varied without departing from the inventive concept, the following claims should provide the sole measure of the scope of the invention.

What is claimed is:

1. A spring comprising first and second expansible chamber fluid pressure motors, each comprising a sealed working chamber having a stationary wall and a movable abutment which has an effective area subject to the pressure within the working chamber, the effective area of the movable abutment of the first fluid motor being the greater of the two; means connecting the two movable abutments in opposing relationship; and two different volatile liquids, one located in each working chamber, the liquids being present in amounts sufficient to charge the volumes of the respective chambers with saturated vapor throughout the operating temperature range of the spring, the liquid having the higher vapor pressure being located in the working chamber of the second fluid motor, and the ratio of the effective areas of the two movable abutments being so correlated with the vapor pressure curves of the two liquids that a substantially constant force is exerted on the connecting means throughout the operating temperature range.

2. The spring defined in claim 1 including a stationary spring seat; and a mechanical spring supported by the seat and acting on the connecting means in aid of the second fluid motor and in opposition to the first.

3. The spring defined in claim 1 in which the two liquids are sulphur dioxide, $SO_2$, and ethyl chloride, $C_2H_2Cl$, the working chamber of the second fluid motor containing the sulphur dioxide.

References Cited in the file of this patent

UNITED STATES PATENTS

| 2,805,854 | Gaebler | Sept. 10, 1957 |

FOREIGN PATENTS

| 11,726 | Great Britain | of 1894 |
| 661,165 | Great Britain | Nov. 21, 1951 |